US007388580B2

(12) United States Patent
Birdwell

(10) Patent No.: US 7,388,580 B2
(45) Date of Patent: Jun. 17, 2008

(54) GENERATING EYES FOR A CHARACTER IN A VIRTUAL ENVIRONMENT

(75) Inventor: Kenneth J. Birdwell, Bellevue, WA (US)

(73) Assignee: Valve Corporation, Bellevue, WA (US)

(*) Notice: Subject to any disclaimer, the term of this patent is extended or adjusted under 35 U.S.C. 154(b) by 559 days.

(21) Appl. No.: 10/841,254

(22) Filed: May 7, 2004

(65) Prior Publication Data
US 2005/0250579 A1    Nov. 10, 2005

(51) Int. Cl.
G06T 17/00 (2006.01)
G06T 15/50 (2006.01)
G06T 15/60 (2006.01)
G06T 15/00 (2006.01)

(52) U.S. Cl. .................. 345/420; 345/419; 345/426
(58) Field of Classification Search ............ 345/420, 345/426, 582
See application file for complete search history.

(56) References Cited

U.S. PATENT DOCUMENTS

| | | | | |
|---|---|---|---|---|
| 4,595,990 A | * | 6/1986 | Garwin et al. ............... | 708/141 |
| 5,471,542 A | * | 11/1995 | Ragland ..................... | 382/128 |
| 5,583,795 A | * | 12/1996 | Smyth ........................ | 702/150 |
| 5,638,176 A | * | 6/1997 | Hobbs et al. ................ | 356/519 |
| 5,719,951 A | * | 2/1998 | Shackleton et al. .......... | 382/118 |
| 5,726,916 A | * | 3/1998 | Smyth ........................ | 702/151 |
| 5,893,719 A | * | 4/1999 | Radow ........................ | 434/271 |
| 5,983,190 A | * | 11/1999 | Trower et al. .............. | 704/276 |
| 6,120,461 A | * | 9/2000 | Smyth ........................ | 600/558 |
| 6,152,563 A | * | 11/2000 | Hutchinson et al. ......... | 351/209 |
| 6,183,364 B1 | * | 2/2001 | Trovato ....................... | 463/32 |
| 6,228,038 B1 | * | 5/2001 | Claessens ................... | 600/558 |
| 6,349,301 B1 | * | 2/2002 | Mitchell et al. ............ | 707/101 |
| 6,400,374 B2 | * | 6/2002 | Lanier ........................ | 345/630 |
| 6,532,011 B1 | * | 3/2003 | Francini et al. ............ | 345/420 |
| 6,578,962 B1 | * | 6/2003 | Amir et al. ................. | 351/209 |

(Continued)

OTHER PUBLICATIONS

Lee, Sooha Park, "Facial animation system with realistic eye movement based on a cognitive model for virtual agents", Ph.D., University of Pennsylvania, 2002, 102 pages.*

(Continued)

Primary Examiner—Ulka Chauhan
Assistant Examiner—Roberta Prendergast
(74) Attorney, Agent, or Firm—Darby & Darby PC; John W. Branch

(57) ABSTRACT

A method for generating relatively realistic virtual eyes for a character in a virtual environment, such as a video game, chat room, and virtual world. Different types of visual effects and textures are layered to create relatively realistic virtual eyes for a character in the virtual environment. These layered visual effects include a sclera texture that is generated to cover the opening surrounded by the virtual eyelids for the character. Layered over the sclera texture is a transparent texture that also covers these openings and includes opaque virtual irises that are arranged in a position that is based on a direction that the character is looking. Additionally, a relatively light spot or additive "glint" texture is layered in a position on top of the virtual iris for the transparent texture that is based at least in part on a summation of light sources that are illuminating the character in a scene of the virtual environment.

19 Claims, 11 Drawing Sheets

U.S. PATENT DOCUMENTS

| | | | | |
|---|---|---|---|---|
| 6,598,971 | B2* | 7/2003 | Cleveland | 351/209 |
| 6,659,611 | B2* | 12/2003 | Amir et al. | 351/210 |
| 6,898,300 | B1* | 5/2005 | Iwaki | 382/117 |
| 6,961,055 | B2* | 11/2005 | Doak et al. | 345/419 |
| 7,006,102 | B2* | 2/2006 | Rowe | 345/582 |
| 7,154,504 | B2* | 12/2006 | Abdo | 345/581 |
| 2002/0051116 | A1* | 5/2002 | Van Saarloos et al. | 351/204 |
| 2003/0086057 | A1* | 5/2003 | Cleveland | 351/204 |
| 2004/0156554 | A1* | 8/2004 | McIntyre | 382/254 |
| 2005/0248577 | A1* | 11/2005 | Birdwell | 345/474 |

OTHER PUBLICATIONS

Paul Francis Neumann, "Virtual Reality Vitrectomy Simulator", Ph.D. Dissertation, University of Illinois at Chicago, 2000, 109 pages.*

* cited by examiner

EYE GLINT

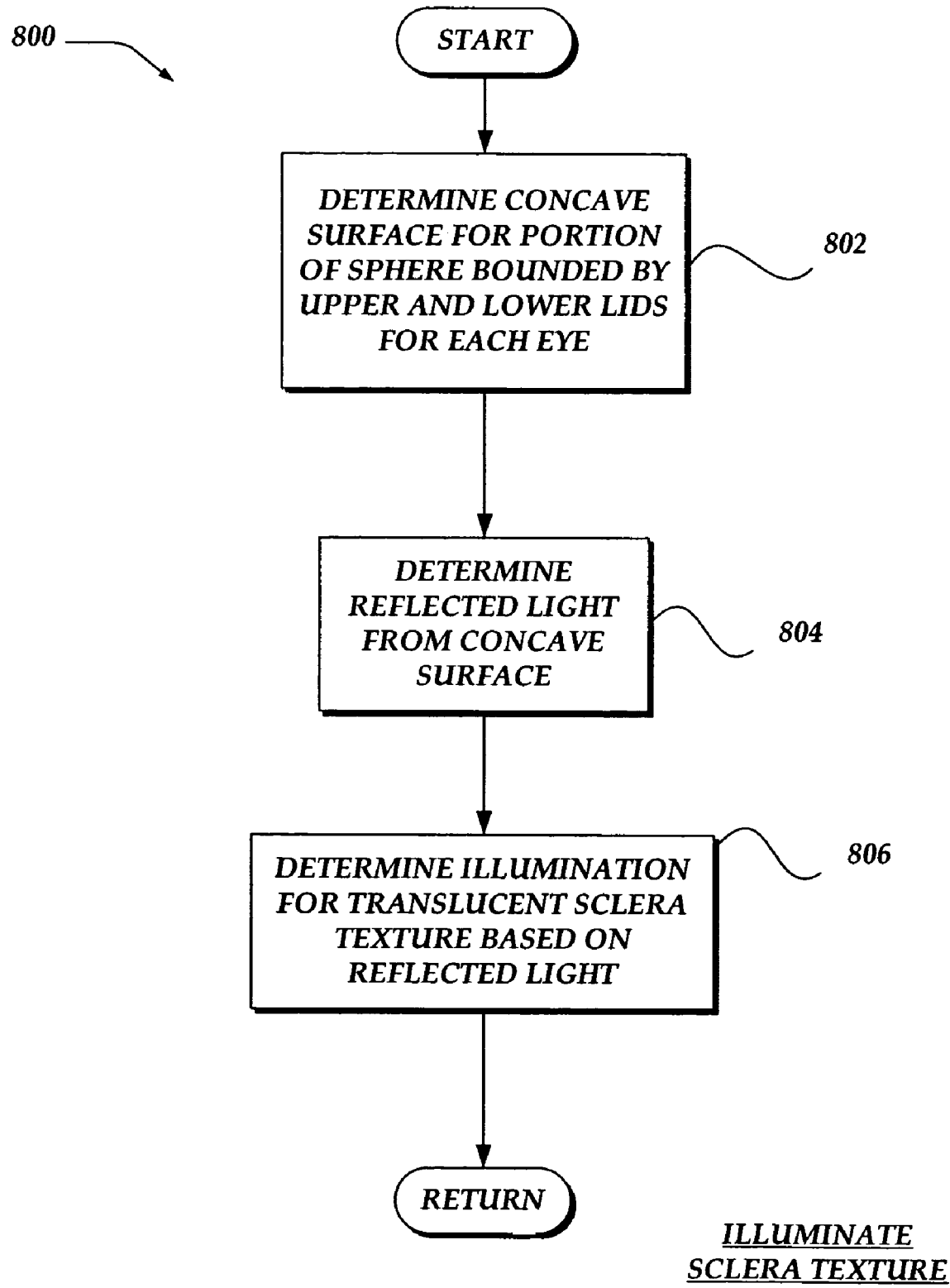

GENERATING EYES FOR A CHARACTER IN A VIRTUAL ENVIRONMENT

FIELD OF THE INVENTION

The present invention relates to virtual environment systems, and in particular, but not exclusively, to a system and method for providing glint in the eye of a character in the virtual environment.

BACKGROUND OF THE INVENTION

As many devoted computer gamers may be aware, the overall interactive entertainment of a computer game may be greatly enhanced with the presence of realistic visual effects. However, creating a robust and flexible visual effects application that is also computationally efficient is a considerable challenge. Such visual effects applications may be difficult to design, challenging to code, and even more difficult to debug. Creating the visual effects application to operate realistically in real-time may be even more difficult.

Today, there are a number of off-the-shelf visual effects applications that are available, liberating many game developers, and other dynamic three-dimensional virtual environment program developers, from the chore of programming this component, themselves. However, the integration of a visual effects application with a game model that describes the virtual environment and its characters often remains complex. An improper integration of the visual effects application with the game model may be visible to the computer gamer by the less than "life-like" appearance of a character, as well as other non-realistic visualizations, reactions, and delays. For example, research directed towards examining human ability to spot non-life-like approximation of a face found that the eyes, and specifically proper glint and shadowing of the eyes, are crucial to presenting believable virtual characters and drawing an emotional response from a player to a virtual character. Such visual artifacts tend to diminish the overall enjoyment in a virtual environment. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein:

FIG. 8 illustrates a flow diagram generally showing one embodiment of a process for determining illumination of the sclera texture, in accordance with the present invention.

DETAILED DESCRIPTION OF THE INVENTION

Figure 1:
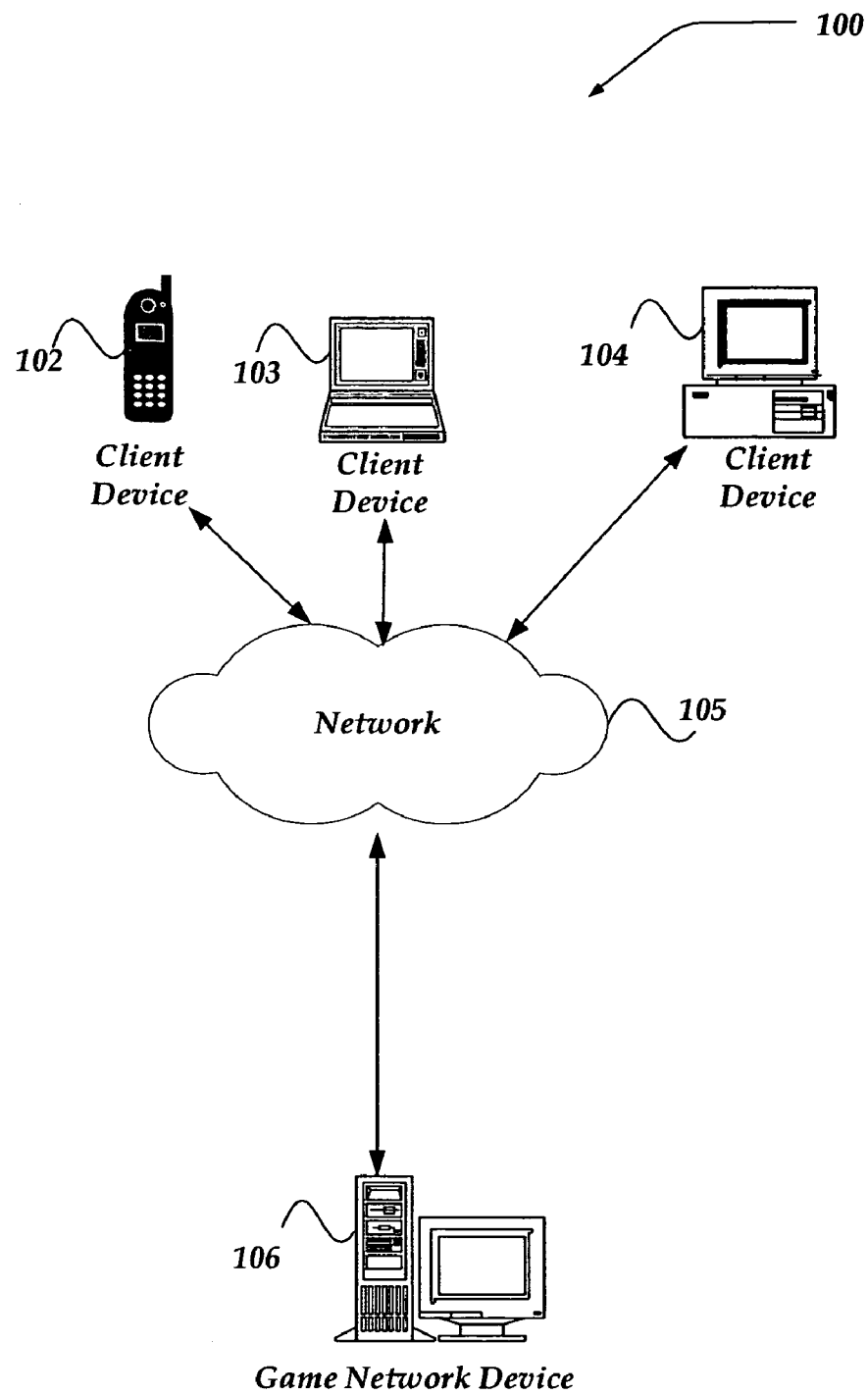
FIG. 1 illustrates one embodiment of an environment in which the invention operates.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Briefly stated, the present invention is directed to a system, apparatus, and method for generating relatively realistic virtual eyes for a character in a virtual environment, such as a video game, chat room, virtual world, machinima, and the like. Different types of visual effects and textures are layered to create realistic virtual eyes for a character in the virtual environment. These layered visual effects include a sclera texture that is generated to cover the openings between the virtual upper and lower eyelids of the character. Layered over the sclera texture is a transparent texture that also covers these openings. Relatively opaque virtual irises are included with the transparent texture and the irises are arranged in a position that is based at least in part on a direction that the character is looking.

Additionally, a relatively light spot or additive "glint" texture is layered in a position on top of the virtual iris for the transparent texture that is based at least in part on a summation of light sources that are illuminating the character in a scene of the virtual environment. The additive glint texture is also positioned on top of the virtual iris based at least in part on the direction that the character is looking.

One or more additional glint textures can also be positioned on top of the transparent texture in another location that is not over the virtual iris and which is based at least in part on a summation of light sources that are illuminating the character. The additive glint textures can be further employed to indicate the direction in the virtual environment that the character is looking. A rendering engine generates the virtual "eyes" of the character with a composited layering of the sclera texture, transparent texture with virtual iris, and the glint texture(s) positioned over the openings between the virtual upper and lower eyelids of the character.

Also, two intersecting spheres can be employed to represent the respective positions of a virtual cornea and a virtual eyeball in an opening between a virtual upper eyelid and a virtual lower eyelid of the character. The position of the intersecting sphere that represents the cornea can be employed to determine the positions for the virtual iris and the glint in the opening between the virtual upper and lower eyelids. Additionally, the convex surface of the sphere representing the portion of the virtual eyeball disposed in the opening between the virtual upper and lower eyelids can be reversed and arranged as a concave surface.

Moreover, each light source illuminating the character can be reflected in part from the concave surfaces of the virtual "eyeball" sphere through the opening bounded by the virtual upper and lower eyelids. The light reflected from the concave surface can be employed to illuminate the sclera texture as a simulated translucent solid. The illumination of the sclera texture with this reflected light enables a simulated "wetness" of the virtual eyes of the character. Also, the illuminated translucent solid simulation for the sclera texture enables relatively life-like shadowing around the edge of the opening bounded by the virtual upper and lower eyelids.

Furthermore, the character is a virtual representation of an animated entity, including but not limited to a human, fish, bird, serpent, mammal, fish, monster, alien, and the like. In one embodiment, the character can employ bone based animations. In another embodiment, the character can employ skeleton-morph animations with soft-skinned and/or hard-skinned vertices. In yet another embodiment, the character can employ face and body animations based on a deformable and relatively seamless mesh.

Illustrative Operating Environment

FIG. 1 illustrates one embodiment of an environment in which the invention may operate. However, not all of these components may be required to practice the invention, and variations in the arrangement and type of the components may be made without departing from the spirit or scope of the invention.

As shown in the figure, system 100 includes client devices 102-104, network 105, and Game Network Device (GND) 106. Network 105 enables communication between client devices 102-104, and GND 106.

Generally, client devices 102-104 may include virtually any computing device capable of connecting to another computing device to send and receive information, including game information, and other interactive information. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, radio frequency (RF) devices, infrared (IR) devices, integrated devices combining one or more of the preceding devices, or virtually any mobile device, and the like. Similarly, client devices 102-104 may be any device that is capable of connecting using a wired or wireless communication medium such as a PDA, POCKET PC, wearable computer, and any other device that is equipped to communicate over a wired and/or wireless communication medium.

Client devices 102-104 may further include a client application, and the like, that is configured to manage the actions described above.

Moreover, client devices 102-104 may also include a game client application, and the like, that is configured to enable an end-user to interact with and play a game, an interactive program, and the like. The game client may be configured to interact with a game server program, or the like. In one embodiment, the game client is configured to provide various functions, including, but not limited to, authentication, ability to enable an end-user to customize a game feature, synchronization with the game server program, and the like. The game client may further enable game inputs, such as keyboard, mouse, audio, and the like. The game client may also perform some game related computations, including, but not limited to, audio, game logic, physics computations, visual rendering, and the like. In one embodiment, client devices 102-104 are configured to receive and store game related files, executables, audio files, graphic files, and the like, that may be employed by the game client, game server, and the like.

In one embodiment, the game server resides on another network device, such as GND 106. However, the invention is not so limited. For example, client devices 102-104 may also be configured to include the game server program, and the like, such that the game client and game server may interact on the same client device, or even another client device. Furthermore, although the present invention is described employing a client/server architecture, the invention is not so limited. Thus, other computing architectures may be employed, including but not limited to peer-to-peer, and the like.

Network 105 is configured to couple client devices 102-104, and the like, with each other, and to GND 106. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 105 may further employ a plurality of wireless access technologies including, but not limited to, 2nd (2G), 3rd (3G), $4^{th}$ (4G) generation radio access for cellular systems, Wireless-LAN, Wireless Router (WR) mesh, and the like. Access technologies such as 2G, 3G, 4G and future access networks may enable wide area coverage for mobile devices, such as client device 102 with various degrees of mobility. For example, network 105 may enable a radio connection through a radio network access such as Global System for Mobil communication (GSM), General Packet Radio Services (GPRS), Enhanced Data GSM Environment (EDGE), Wideband Code Division Multiple Access (WCDMA), Code Division Multiple Access 2000 (CDMA 2000) and the like.

Furthermore, remote computers and other related electronic devices could be remotely connected to either LANs or WANs via a modem and temporary telephone link. In essence, network 105 includes any communication method by which information may travel between client devices 102-104 and GND 106, and the like.

Additionally, network 105 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as, but not limited to, twisted pair, coaxial cable, fiber optics, wave guides, and other wired media and wireless media such as, but not limited to, acoustic, RF, infrared, and other wireless media.

GND 106 is described in more detail below in conjunction with FIG. 2. Briefly, however, GND 106 includes virtually any network device configured to include the game server program, and the like. As such, GND 106 may be implemented on a variety of computing devices including personal computers, desktop computers, multiprocessor systems, microprocessor-based devices, network PCs, servers, network appliances, and the like.

GND 106 may further provide secured communication for interactions and accounting information to speedup periodic update messages between the game client and the game server, and the like. Such update messages may include, but are not limited to a position update, velocity update, audio update, graphics update, authentication information, and the like.

Illustrative Server Environment

Figure 2:
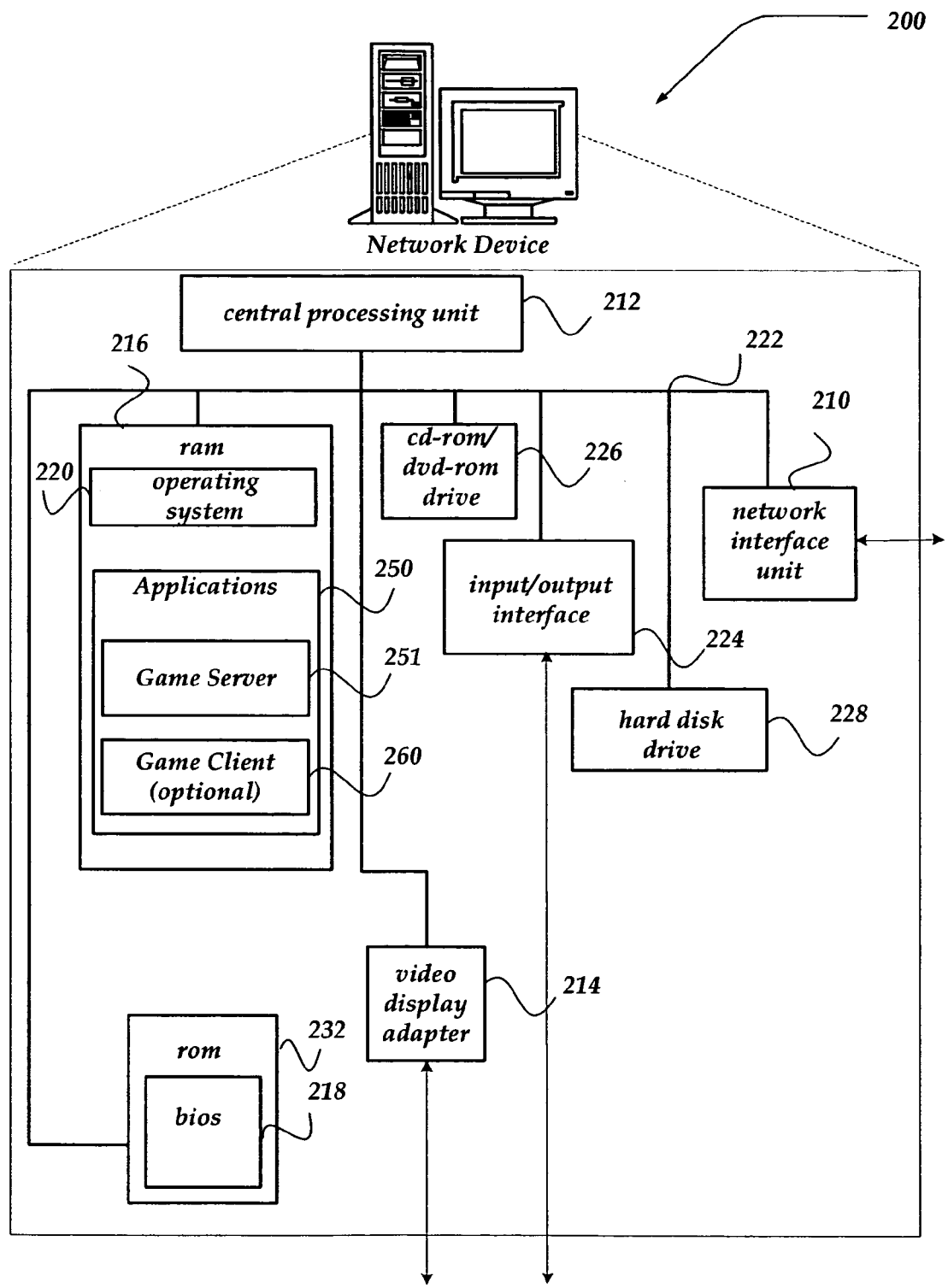
FIG. 2 shows a functional block diagram of one embodiment of a network device configured to operate with a game server.

FIG. 2 shows one embodiment of a network device, according to one embodiment of the invention. Network device 200 may include many more components than those shown. The components shown, however, are sufficient to disclose an illustrative embodiment for practicing the invention. Network device 200 may represent, for example, GND 106 of FIG. 1.

Network device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200. Any general-purpose operating system may be employed. Basic input/output system ("BIOS") 218 is also provided for controlling the low-level operation of network device 200. As illustrated in FIG. 2, network device 200 also can communicate with the Internet, or some other communications network, such as network 105 in FIG. 1, via network interface unit 210, which is constructed for use with various communication protocols including the TCP/IP protocols. For example, in one embodiment, network interface unit 210 may employ a hybrid communication scheme using both TCP and IP multicast with a client device, such as client devices 102-104 of FIG. 1. Network interface unit 210 is sometimes known as a transceiver, network interface card (NIC), and the like.

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs may include transcoders, schedulers, graphics programs, database programs, word processing programs, HTTP programs, user interface programs, various security programs, and so forth. Mass storage may further include applications such as game server 251 and optional game client 260.

Figure 3:
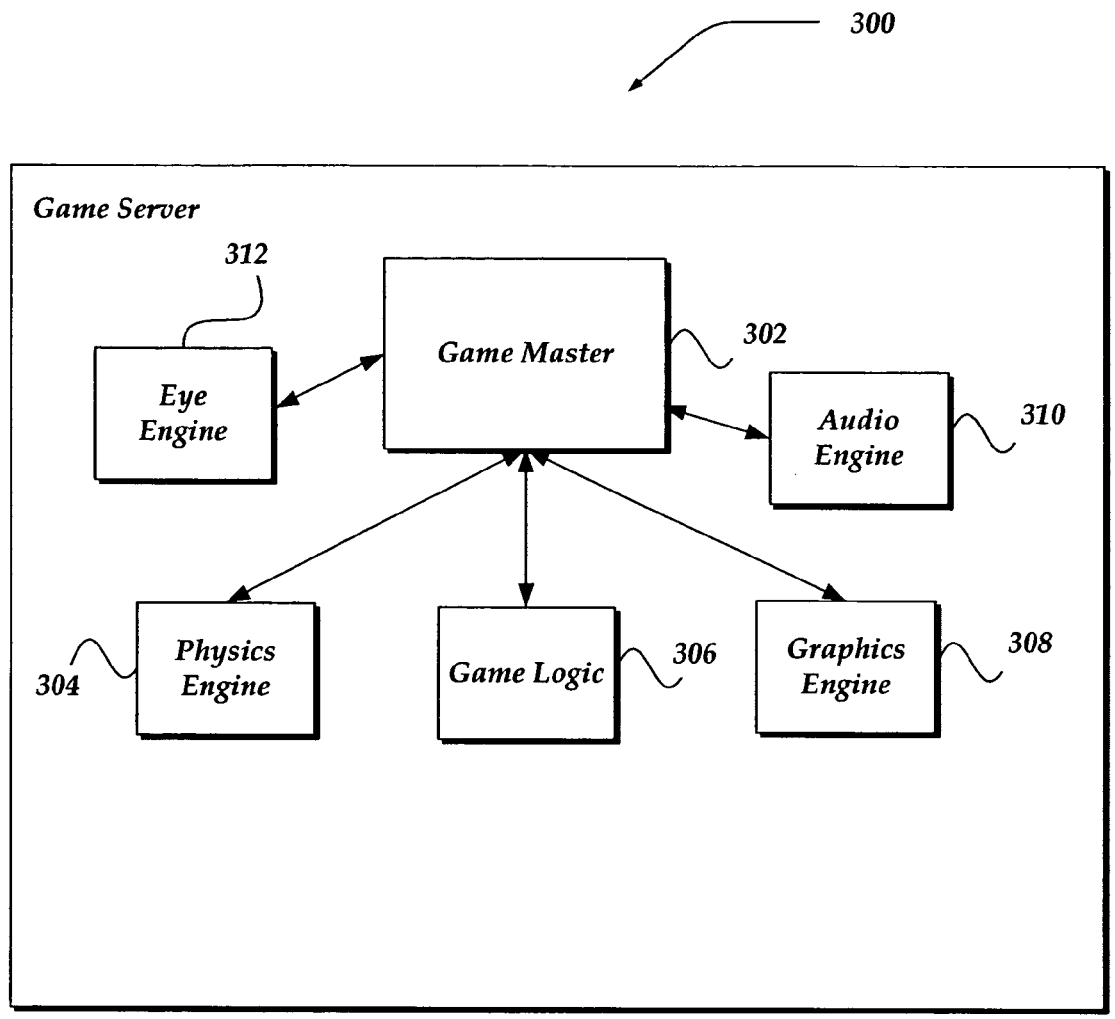
FIG. 3 illustrates a function block diagram of one embodiment of the game server of FIG. 2.

One embodiment of game server 251 is described in more detail in conjunction with FIG. 3. Briefly, however, game server 251 is configured to enable an end-user to interact with a game, and similar three-dimensional modeling programs. In one embodiment, game server 251 interacts with a game client residing on a client device, such as client devices 102-105 of FIG. 1 and/or optional game client 260 residing on network device 200. Game server 251 may also interact with other components residing on the client device, another network device, and the like. For example, game server 251 may interact with a client application, security application, transport application, and the like, on another device.

Network device 200 may also include an SMTP handler application for transmitting and receiving e-mail, an HTTP handler application for receiving and handing HTTP requests, and an HTTPS handler application for handling secure connections. The HTTPS handler application may initiate communication with an external application in a secure fashion. Moreover, network device 200 may further include applications that support virtually any secure connection, including but not limited to TLS, TTLS, EAP, SSL, IPSec, and the like.

Network device 200 also includes input/output interface 224 for communicating with external devices, such as a mouse, keyboard, scanner, or other input devices not shown in FIG. 2. Likewise, network device 200 may further include additional mass storage facilities such as CD-ROM/DVD-ROM drive 226 and hard disk drive 228. Hard disk drive 228 may be utilized to store, among other things, application programs, databases, client device information, policy, security information including, but not limited to certificates, ciphers, passwords, and the like.

FIG. 3 illustrates a function block diagram of one embodiment of a game server for use in GND 106 of FIG. 1. As such, game server 300 may represent, for example, game server 251 of FIG. 2. Game server 300 may include many more components than those shown. The components shown, however, are sufficient to disclose an illustrative embodiment for practicing the invention. It is further noted that virtually any distribution of functions may be employed across and between a game client and game server. Moreover, the present invention is not limited to any particular architecture, and another may be employed. However, for ease of illustration of the invention, a client/server architecture has been selected for discussion below. Thus, as shown in the figure, game server 300 includes game master 302, physics engine 304, game logic 306, graphics engine 308, audio engine 310, and eye engine 312.

Game master 302 may also be configured to provide authentication, and communication services with a game client, another game server, and the like. Game master 302 may receive, for example, input events from the game client, such as keys, mouse movements, and the like, and provide the input events to game logic 306, physics engine 304, graphics engine 308, audio engine 310, eye engine 312, and the like. Game master 302 may further communicate with several game clients to enable multiple players, and the like. Game master 302 may also monitor actions associated with a game client, client device, another game server, and the like, to determine if the action is authorized. Game master 302 may also disable an input from an unauthorized sender.

Game master 302 may further manage interactions between physics engine 304, game logic 306, and graphics engine 308, audio engine 310, and eye engine 312. For example, in one embodiment, game master 302 may perform substantially similar to processes described below in conjunction with FIGS. 7 and 8.

Game logic 306 is also in communication with game master 302, and is configured to provide game rules, goals, and the like. Game logic 306 may include a definition of a game logic entity within the game, such as an avatar, vehicle, and the like. Game logic 306 may include rules, goals, and the like, associated with how the game logic entity may move, interact, appear, and the like, as well. Game logic 306 may further include information about the environment, and the like, in which the game logic entity may interact. Game logic 306 may also included a component associated with artificial intelligence, neural networks, and the like.

Physics engine 304 is in communication with game master 302. Physics engine 304 is configured to provide mathematical computations for interactions, movements, forces, torques, collision detections, collisions, and the like. In one embodiment, physics engine 304 is a provided by a third party. However, the invention is not so limited and virtually any physics engine 304 may be employed that is configured to determine properties of entities, and a relationship between the entities and environments related to the laws of physics as abstracted for a virtual environment.

Physics engine 304 may determine the interactions, movements, forces, torques, collisions, and the like for a physic's proxy. Virtually every game logic entity may have associated with it, a physic's proxy. The physic's proxy may be substantially similar to the game logic entity, including, but not limited to shape. In one embodiment, however, the physic's proxy is reduced in size from the game logic entity by an amount epsilon. The epsilon may be virtually any value, including, but not limited to a value substantially equal to a distance the game logic entity may be able to move during one computational frame.

Graphics engine 308 is in communication with game master 302 and is configured to determine and provide graphical information associated with the overall game. As such, graphics engine 308 may include a bump-mapping component for determining and rending surfaces having high-density surface detail. Graphics engine 308 may also include a polygon component for rendering three-dimensional objects, an ambient light component for rendering ambient light effects, and the like. Graphics engine 308 may further include an animation component, and the like. However, graphics engine 308 is not limited to these components, and others may be included, without departing from the scope or spirit of the invention. For example, additional components may exist that are employable for managing and storing such information, as map files, entity data files, environment data files, color palette files, texture files, and the like.

Audio engine 310 is in communication with game master 302 and is configured to determine and provide audio information associated with the overall game. As such, audio engine 310 may include an authoring component for generating audio files associated with position and distance of objects in a scene of the virtual environment. Audio engine 310 may further include a mixer for blending and cross fading channels of spatial sound data associated with objects and a character interacting in the scene.

Eye engine 312 is in communication with game master 302 and is configured to determine and provide the textures, and glint for rendering virtual eyes for a character in the virtual environment. As such, eye engine 312 may include an authoring component for generating sclera textures, virtual iris textures, and glint. Eye engine 312 may further include a facility for determining the illumination of a translucent sclera texture based in part on virtual light incident on the character that is subsequently reflected from concave surfaces in the openings bounded by the character's virtual upper and lower eyelids.

In another embodiment, a game client can be employed to assist with or solely perform single or combinatorial actions associated with game server 300, including those actions associated with game master 302, eye engine 312, audio engine 310, graphics engine 308, game logic 306, and physics engine 304.

Illustrative Front Views

Figure 4A:
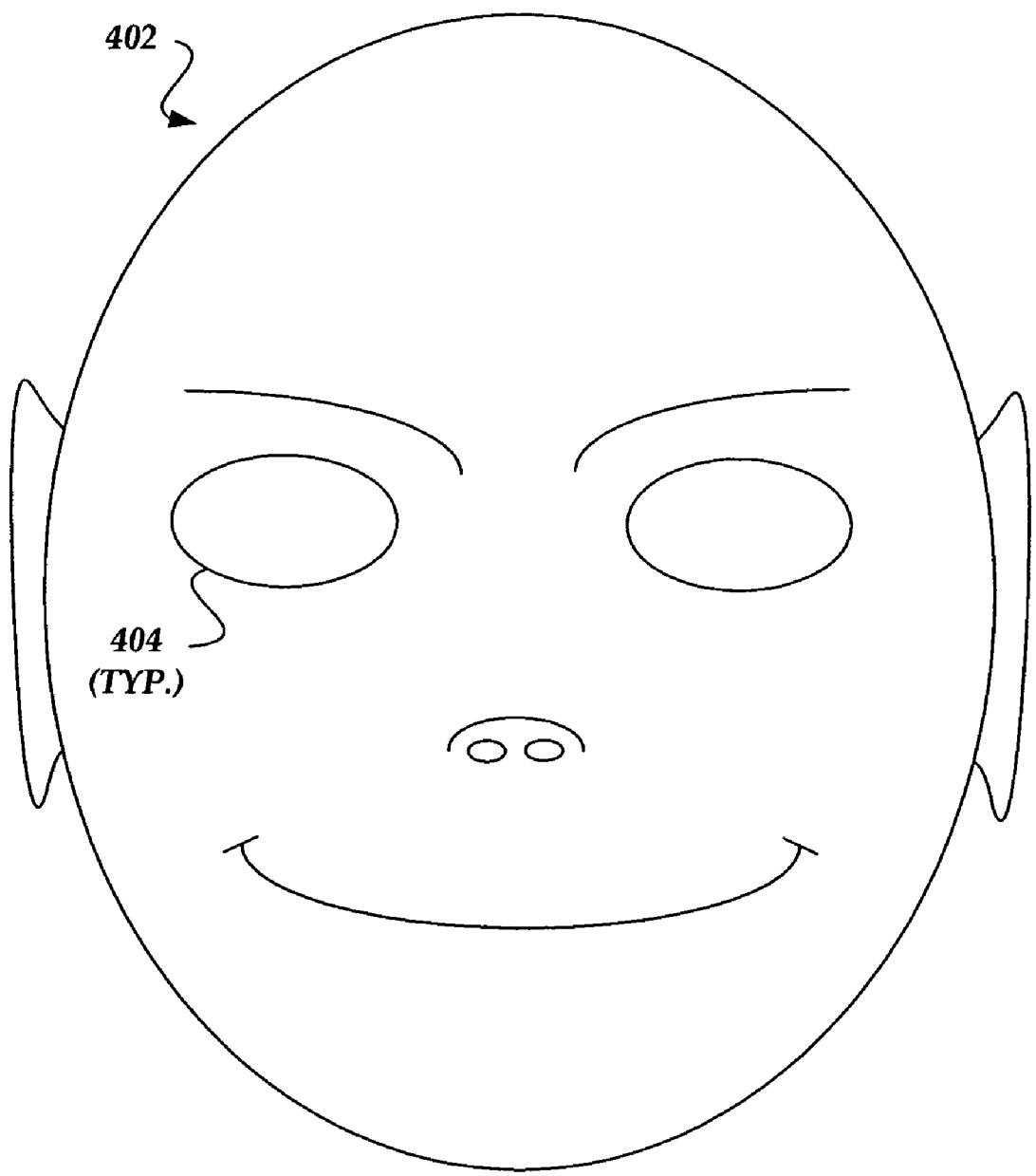
FIG. 4A shows a forward view of a head of a character with a sclera texture positioned between the upper and lower eyelids for each eye of the character.

FIG. 4A shows a forward view of head 402 of a character with sclera texture 404 positioned in the openings bounded by the virtual upper and lower eyelids for each virtual eye of the character. Although not shown, sclera texture 404 is opaque but it can be illuminated as a substantially translucent solid. Also, a size of sclera texture 404 is automatically adjusted based on a change in the size of an opening bounded by virtual upper and lower eyelids, e.g., if the character blinks, squints, stares, and the like.

Figure 4B:
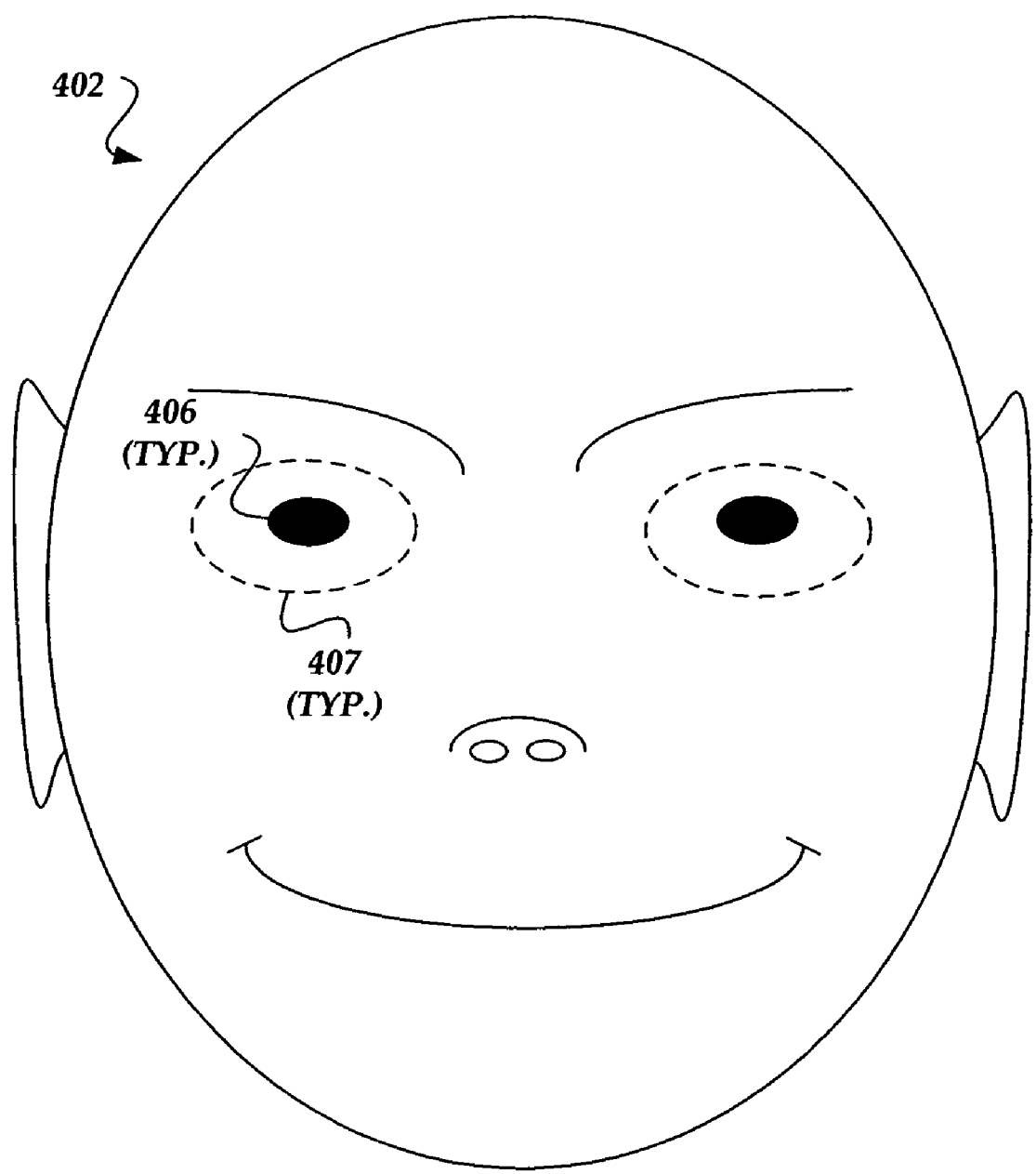
FIG. 4B illustrates a forward view of a head of a character with a transparent texture with a virtual iris positioned between the upper and lower eyelids for each eye of the character.

FIG. 4B illustrates a forward view of head 402 of a character with transparent textures 407 and substantially opaque virtual irises 406 that are positioned in the openings bounded by the virtual upper and lower eyelids for each virtual eye of the character. A size of transparent texture 407 is automatically adjusted based on a change in the size of an opening bounded by the virtual upper and lower eyelids, e.g., if the character blinks, squints, stares and the like. Similarly, if the character partially or completely closes the opening bounded by the virtual upper and lower eyelids, the display of virtual iris 406 is blocked proportionally. In case of squinting, virtual irises 406 of transparent texture 407 are occluded instead of being stretched or compressed like the transparent texture 407.

Figure 6:
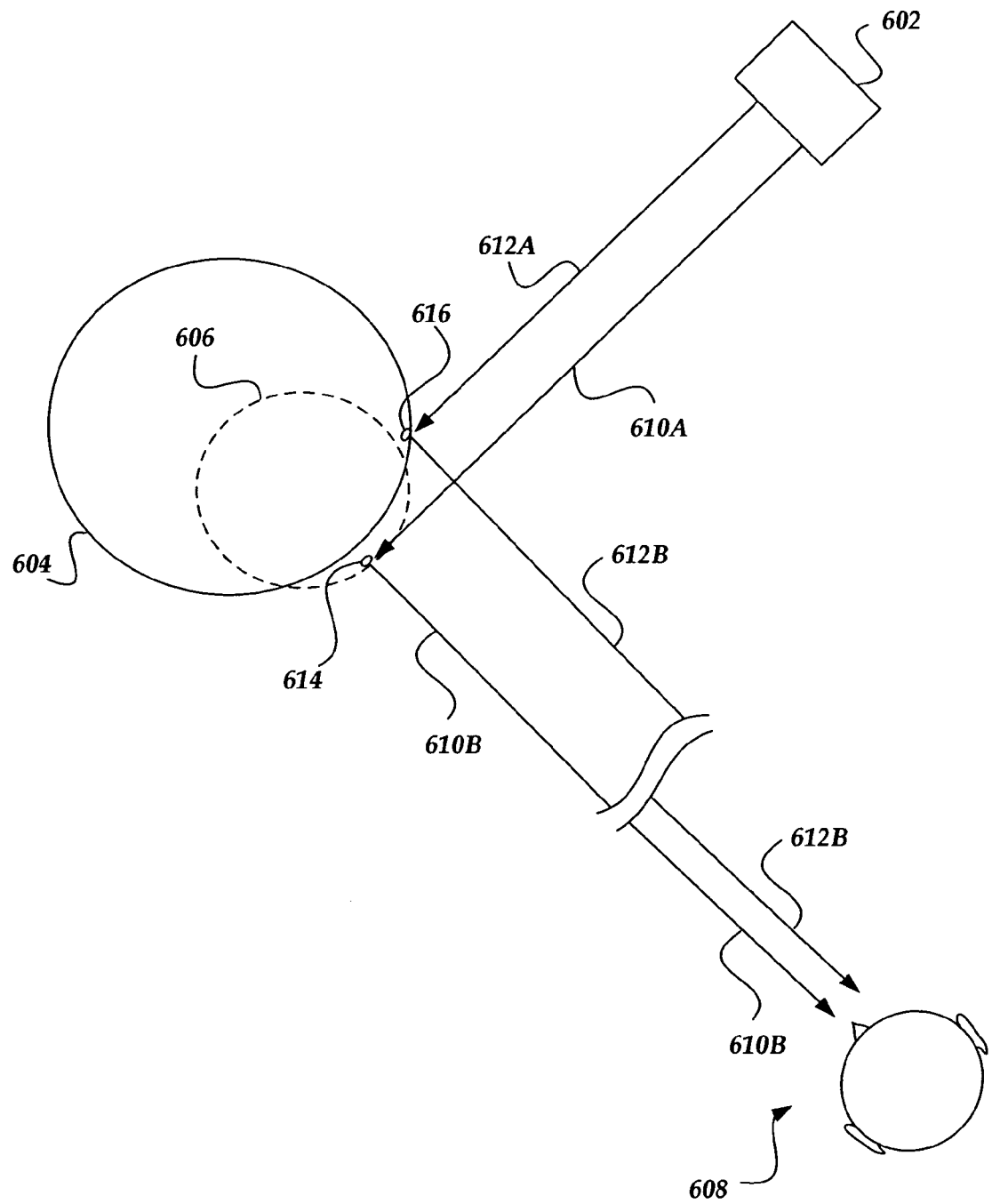
FIG. 6 illustrates two intersecting spheres employed to determine the positions of glint in the openings bounded by the virtual upper and lower eyelids and which are based in part on illumination by a virtual light source in the virtual environment.

In the discussion of FIG. 6 below, a facility for determining the position of each virtual iris is disclosed. Briefly, intersecting spheres are employed to determine the position of virtual corneas and virtual eyeballs in the openings bounded by the virtual upper and lower eyelids of the character. Based in part on the direction that the character is looking, the spheres are positioned in the openings. The subsequent direction/orientation of the spheres is employed to determine the position for each virtual iris in the opening bounded by the virtual upper and lower eyelids.

Figure 4C:
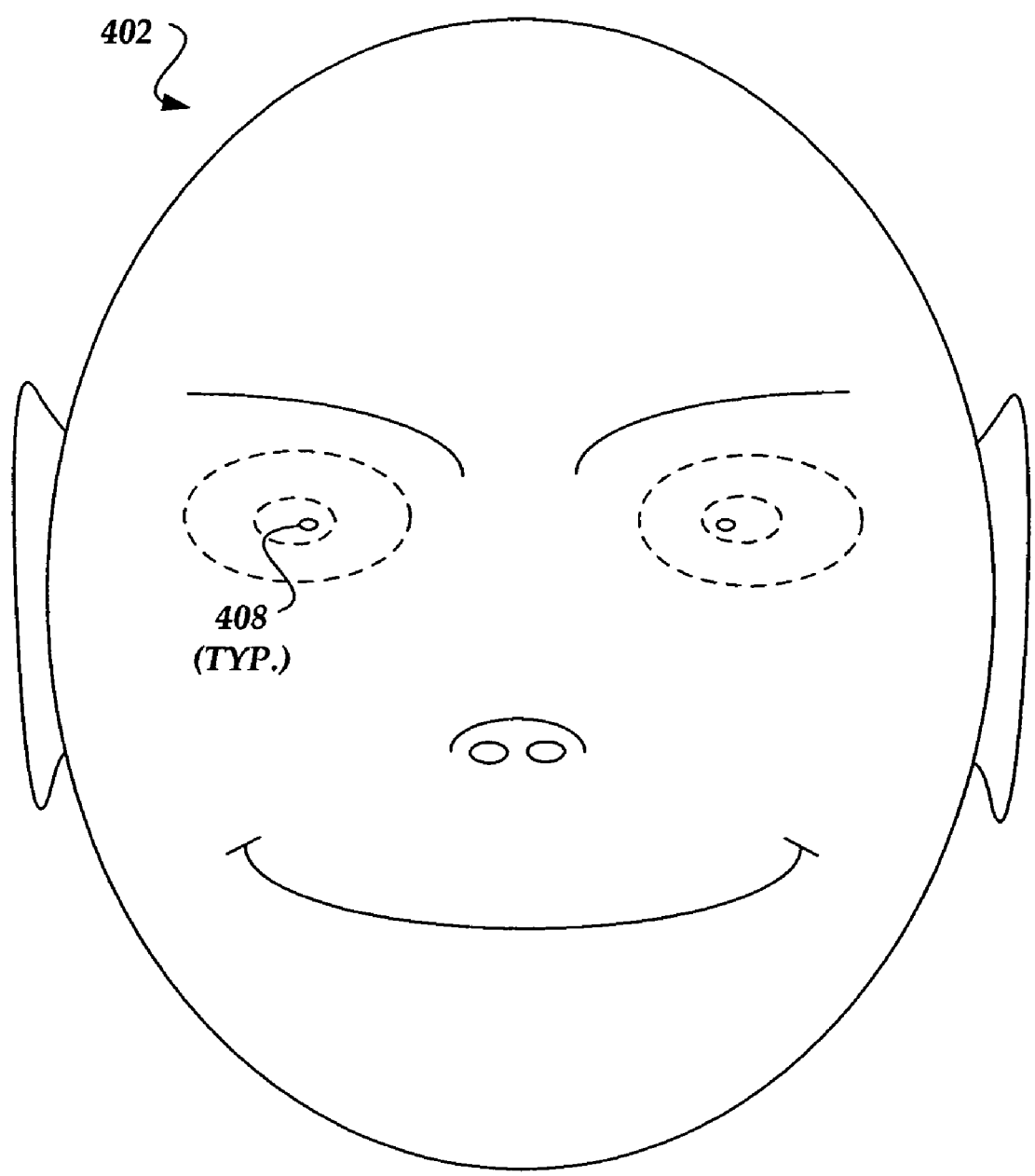
FIG. 4C shows a forward view of a head of a character with a glint at a location over a virtual iris (not shown) disposed between the upper and lower eyelids for each eye of the character.

FIG. 4C shows a forward view of head 402 of a character with glints 408 positioned at locations over virtual irises (dotted line) in openings bounded by the virtual upper and lower eyelids for each virtual eye of the character. If the character partially or completely closes the opening bounded by the virtual upper and lower eyelids, the display of glints 408 can be blocked proportionally.

In the discussion of FIG. 6 below, a facility for determining the position of each glint is disclosed. Briefly, intersecting spheres are employed to determine the position of virtual corneas and virtual eyeballs in the openings bounded by the virtual upper and lower eyelids of the character. Based in part on the direction that the character is looking, the spheres are positioned in the openings. The subsequent direction/orientation of the spheres and light incident upon the character is employed to determine the position for each additive glint texture in the opening bounded by the virtual upper and lower eyelids.

Figure 4D:
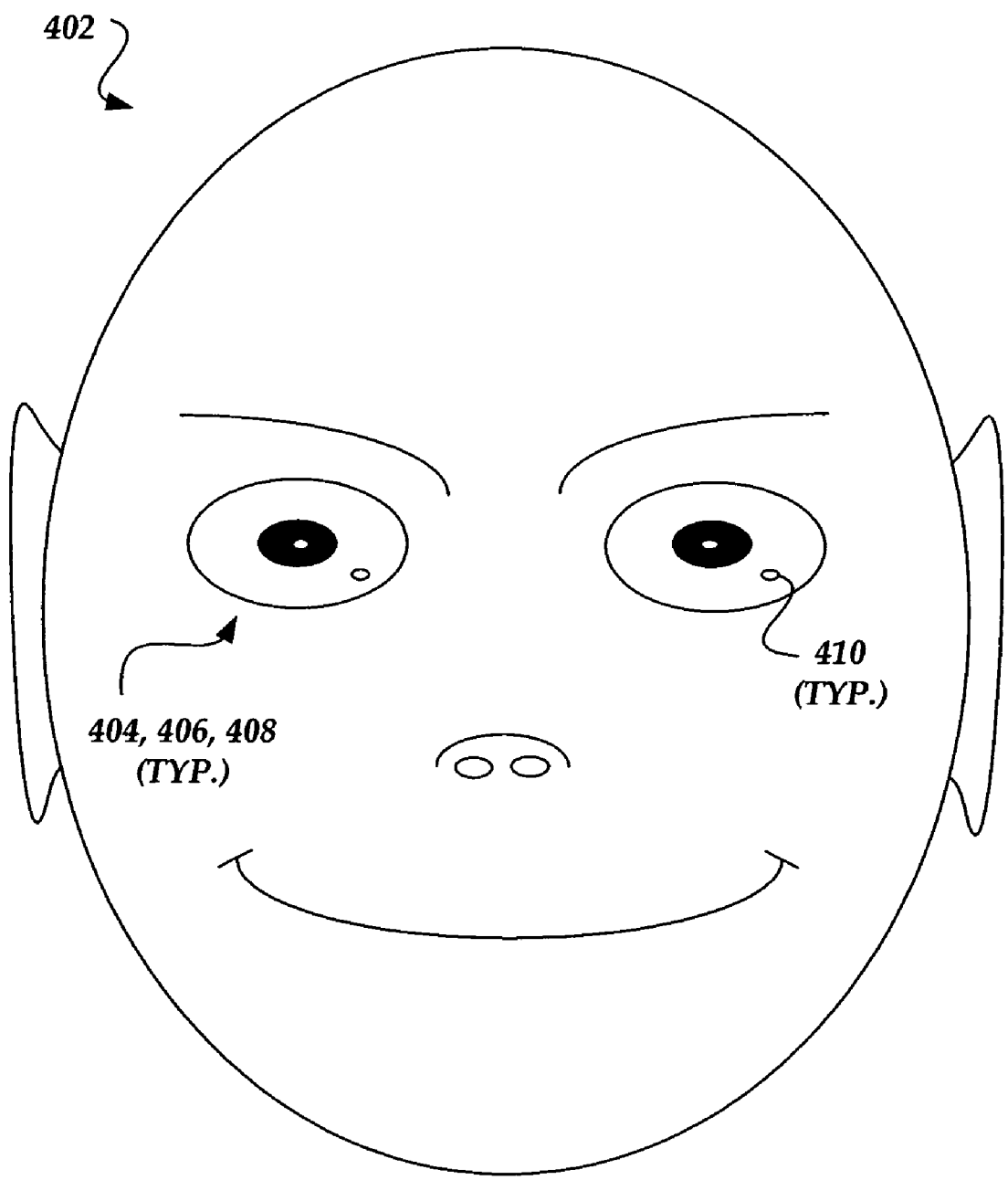
FIG. 4D illustrates a forward view of a head of a character with virtual eyes rendered by the combined layering of the sclera texture, transparent texture with virtual iris, and glint between the upper and lower eyelids for the character.

FIG. 4D illustrates a forward view of head 402 of a character with relatively realistic virtual eyes rendered by the combined layering of sclera texture 404, transparent texture with virtual iris 406, additive glint texture 408 (over the virtual iris), and another additive glint texture 410 (over the sclera texture) in the openings bounded by the virtual upper and lower eyelids for the character. Additive glint texture 410 is layered on top of transparent texture 406 at a position that is over sclera texture 404, not over the virtual iris. Additionally, the facility discussed for FIG. 6 below for determining the position of each virtual irises can also be employed for determining the position for each additive glint texture in the opening bounded by the virtual upper and lower eyelids.

Figure 5:
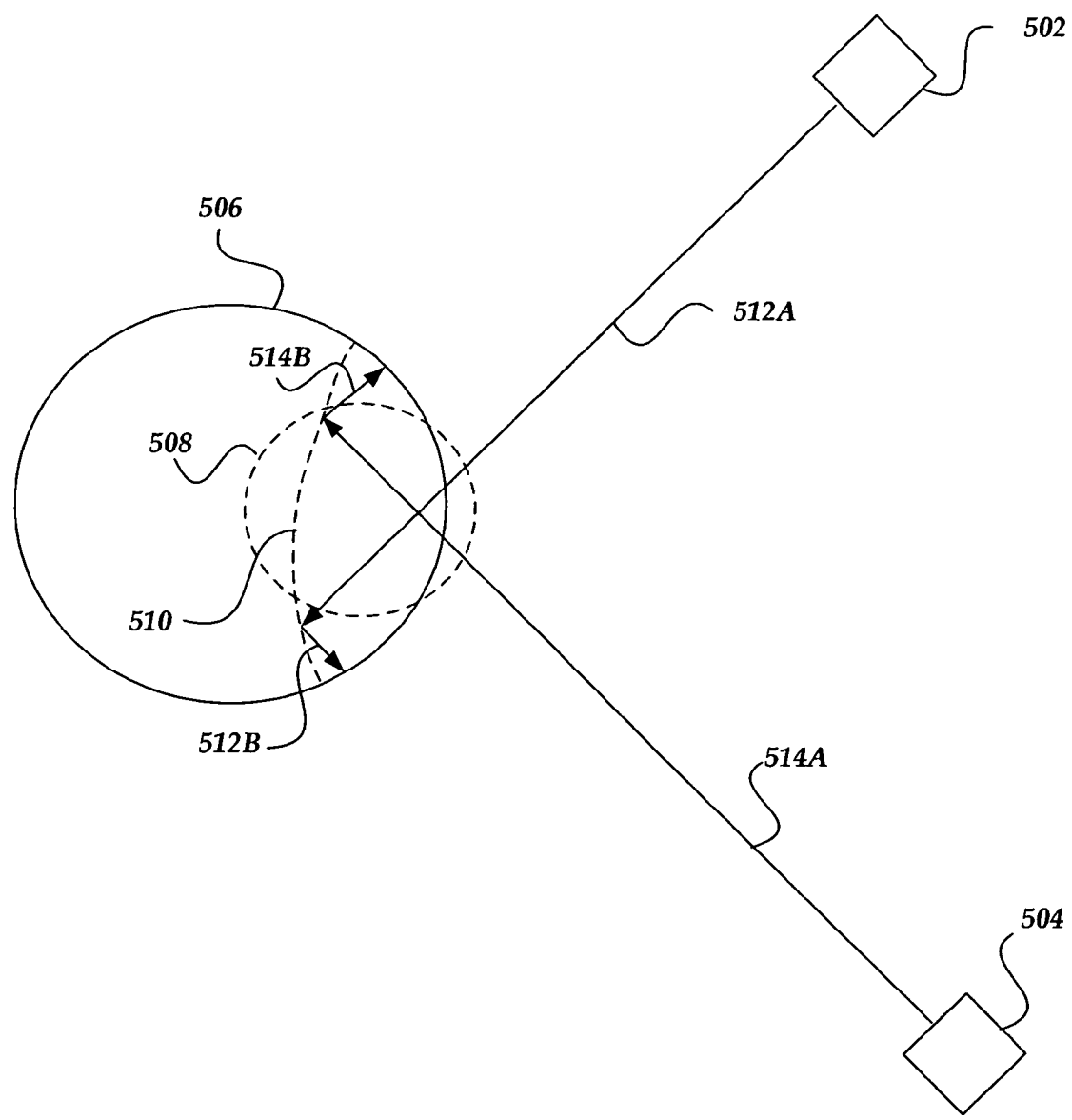
FIG. 5 shows two intersecting spheres with one sphere having a concave surface between an opening bounded by the upper and lower eyelids for determining the illumination of a translucent sclera by reflections from virtual light sources in the virtual environment.

In the discussion of FIG. 5 below, a facility for determining the illumination of the translucent sclera texture is disclosed. Briefly, intersecting spheres are employed to determine the position of virtual corneas and virtual eyeballs in the openings bounded by the virtual upper and lower eyelids of the character. Light reflected from a concave surface of the virtual "eyeball"sphere is employed to determine the illumination of a translucent solid simulated for the sclera texture and shadows for the virtual upper and lower eyelids.

Illustrative Intersecting Spheres

FIG. 5 shows a plan view of two intersecting spheres 506 and 508 where sphere 506 corresponds to the orientation of a virtual eyeball in the opening bounded by the upper and lower eyelids for the character. Similarly, the orientation of sphere 508 corresponds to the orientation of a virtual cornea in the opening bounded by the virtual upper and lower eyelids. The "direction" that the virtual eyeball is looking corresponds to the axis from the center point of sphere 506 to the center point of sphere 508.

Although the virtual upper and lower eyelids are not shown, concave surface 510 is the reverse of the portion of the convex surface of virtual eyeball sphere 506 in the opening bounded by the virtual upper and lower eyelids of the character. External light source 502 provides light that is incident upon spheres 506 and 508 from an upper direction. Line segment 512A represents light incident on the spheres and line segment 512B represents downwardly reflected light from external light source 502. Similarly, external light source 504 provides light that is incident upon spheres 506 and 508 from a lower direction. Line segment 514A represents light incident on the spheres and line segment 514B represents upwardly reflected light from external light source 504.

The upward and downward orientations for reflected light can enable the projection of shadows at the edges of the openings bounded by the virtual upper and lower eyelids. Previously, shadows around the edges of a virtual eye were projected onto a sphere that simulated the eyeball and caused relatively inferior results with respect to a realistic presentation of the character. Also, the total reflected light can be employed to modulate illumination of the translucent solid simulated for the sclera texture (not shown) in a manner that simulates "wetness".

FIG. 6 shows a plan view of two intersecting spheres 604 and 606 where sphere 604 corresponds to the position of a virtual eyeball in the opening bounded by the virtual upper and lower eyelids for the character. Similarly, the position of sphere 606 corresponds to the position of a virtual cornea in the opening bounded by the virtual upper and lower eyelids.

Although the virtual upper and lower eyelids are not shown, the convex surface of sphere 606 disposed outside the circumference of sphere 604 simulates the virtual cornea for the character in the opening bounded by the virtual eyelids. External light source 602 provides light that is incident upon spheres 604 and 606 from an upper direction. Line segment 610A represents light incident on virtual cornea sphere 606 and line segment 610B represents reflected light from external light source 602 that is visible to character 608 in the virtual environment. Additive glint texture 614 is disposed at the point where the light incident upon virtual cornea sphere 606 is reflected back to character 608.

Similarly, line segment 612A represents light incident upon virtual eyeball sphere 604 and line segment 612B represents reflected light from external light source 602 that is visible to character 608. Additive glint texture 616 is disposed at the point where the light incident upon virtual eyeball sphere 604 is reflected back to character 608. Moreover, the orientation of spheres 604 and 606 in the direction that the character is looking and the direction of reflected light from these spheres is employed to project the positions of additive glint textures 616 and 614 on the sclera texture and virtual iris, respectively.

Additionally, once the respective positions of glints 614 and 616 on spheres 604 and 606 are determined, the glints are projected onto a virtual camera space. The virtual camera space projections of the glints are subsequently layered over the combined layering of the sclera texture and transparent texture with virtual iris.

Illustrative Flowcharts

Figure 7:
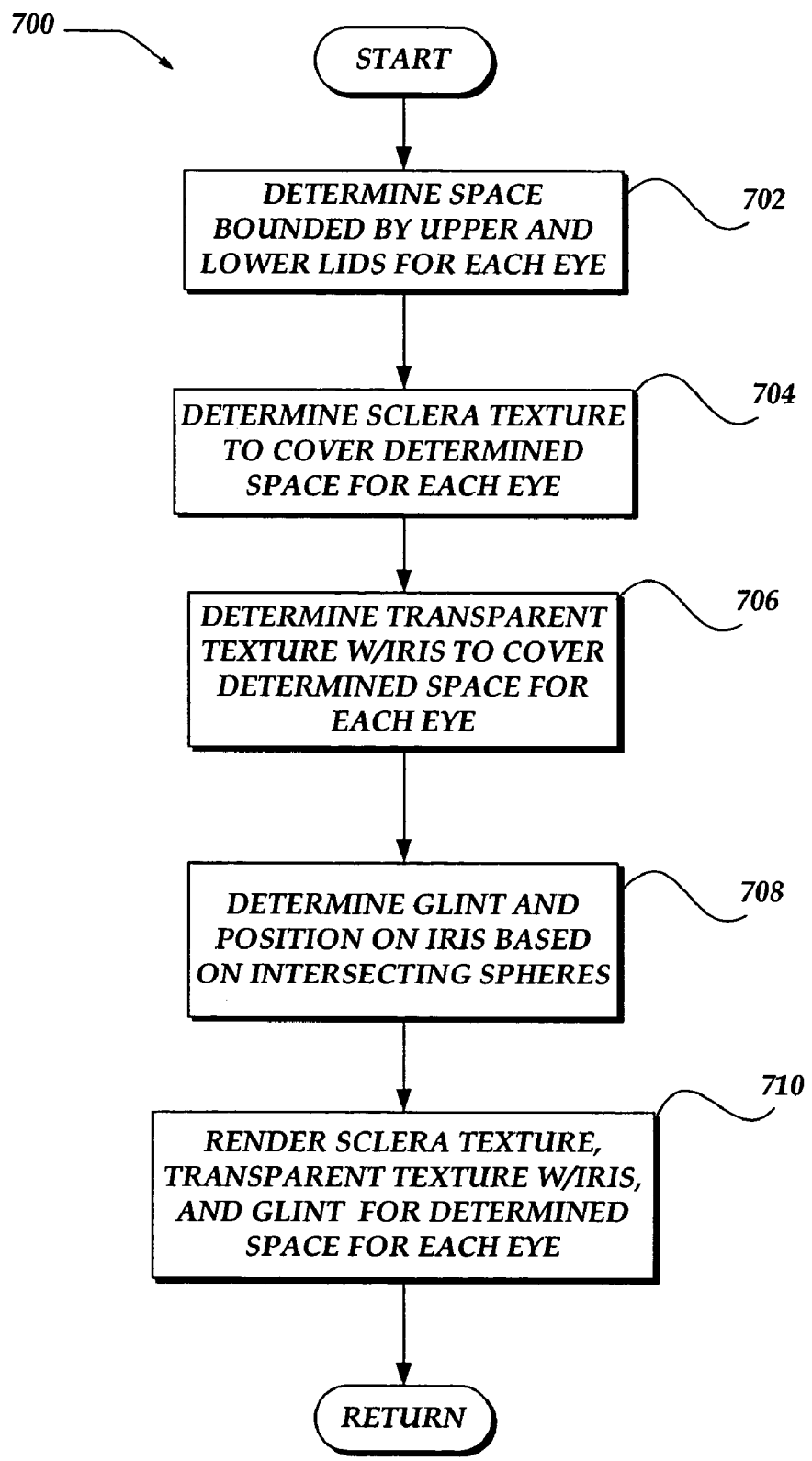
FIG. 7 shows a flow diagram generally showing one embodiment of a process for determining a layered combination of textures and glint in the openings bounded by the virtual upper and lower eyelids for a character in the virtual environment.

FIG. 7 shows flow diagram 700 generally showing one embodiment of a process for determining a layered combination of textures and glint in the openings bounded by the virtual upper and lower eyelids for a character in a virtual environment. Moving from a start block, the process advances to block 702 where the space in the opening bounded by the virtual upper and lower eyelids of each virtual eye for the character is determined. Flowing to block 704, the process determines the sclera texture to cover the determined space. The sclera texture is typically preauthored and can be illuminated as a simulated translucent solid. Also, the illumination of the sclera texture by reflected light from external light incident upon the character is determined based at least in part on a projection from an intersecting spheres method, and the like. (See discussion of FIGS. 5 and 6).

At block 706, the process determines the transparent texture to cover the determined space for each virtual eye. Also, the position of a relatively opaque virtual iris on the transparent texture is determined based at least in part on a projection from an intersecting spheres method, and the like. (See discussion of FIGS. 5 and 6). Stepping to block 708, the process determines the additive glint texture and its position on the virtual iris based in part on a projection from an intersecting spheres method, and the like. (See FIG. 6). The process advances to block 710 where the sclera texture, transparent texture with relatively opaque virtual iris, and additive glint texture(s) are composited together and rendered as a surface that covers the determined space for each virtual eye. Next, the process returns to performing other actions.

FIG. 8 illustrates flow diagram 800 generally showing one embodiment of a process for determining illumination of the sclera texture based in part on the reflected light from a concave surface of each virtual eyeball sphere bounded by the virtual upper and lower eyelids of a character in the virtual environment. Moving from a start block, the process advances to block 802 where a concave surface is determined for that portion of the convex surface of the virtual eyeball sphere (See FIG. 5) that is bounded by the virtual upper and lower eyelids of the character. At block 804, the reflected light is determined for the external light that is reflected from the concave surface.

Flowing to block 806, the illumination of a translucent solid simulation for the sclera texture is determined based at least in part on the reflected light from the concave surface. Next, the process returns to performing other actions.

Additionally, although the examples listed above are substantially directed to a virtual eye that has an upper virtual eyelid and a lower virtual eyelid, in other embodiments the circumference of the virtual eye can be surrounded by a singular circular virtual eyelid either solely or in combination with upper and lower virtual eyelids. Also, one or more of the virtual eyelids may be opaque and illuminated as a simulated translucent solid.

Moreover, it will be understood that each block of the flowchart illustrations discussed above, and combinations of blocks in the flowchart illustrations above, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor, provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for generating at least one virtual eye for a character in a virtual environment, comprising:
   determining a size of a space bounded by a virtual eyelid for the at least one virtual eye of the character;
   determining a sclera texture that is sized to cover the space bounded by the virtual eyelid;
   determining a transparent texture that is sized to cover the sclera texture covering the space bounded by the virtual eyelid, wherein the transparent texture includes a virtual iris that is relatively smaller and positioned on the transparent texture in an orientation that corresponds to a direction that the character is looking in the virtual environment;
   simulating a translucent solid for the translucent sclera texture, and wherein the translucent solid is illuminated based at least in part on at least one virtual light that is reflected by a concave surface inside the space bounded by the virtual eyelid of the character, and wherein the reflection of the light from the concave surface enables shadowing at an edge of an upper portion of the virtual eyelid and shadowing at another edge of a lower portion of the virtual eyelid;
   determining an additive glint texture and determining a position for placing the additive glint texture on the virtual iris based at least in part on the direction that the character is looking and at least one virtual light that is reflected at the space bounded by the virtual eyelid of the character; and
   displaying the at least one generated virtual eye of a character in a virtual environment.

2. The method of claim 1, further comprising enabling a compositing of a respective layering of the sclera texture, transparent texture with the virtual iris, and the additive glint texture for the rendering of the at least one virtual eye of the character in the space bounded by the virtual eyelid.

3. The method of claim 1, wherein the relatively translucent solid is illuminated at least in part by light reflected from the concave surface of a first of two intersecting spheres, and wherein the first sphere is arranged as a virtual eye ball and a second sphere overlays the first sphere as a virtual cornea, and wherein positions of the first sphere and the second sphere correspond to the direction that the character is looking in the virtual environment.

4. The method of claim 1, wherein the illumination is employed to simulate virtual wetness of the sclera texture.

5. The method of claim 1, wherein a position of the additive glint texture on the virtual iris is based in part on an orientation of a second of two intersecting spheres, and wherein a first sphere is arranged as a virtual eye ball and the second sphere overlays the first sphere as a virtual cornea that corresponds to the positioning of the virtual iris, and wherein axial positions of the first and second spheres correspond to the direction that the character is looking in the virtual environment.

6. The method of claim 1, determining another additive glint texture and its position on the sclera texture based at least in part on the direction that the character is looking in the virtual environment and the at least one virtual light that is reflected at the space bounded by the virtual eyelid of the character.

7. The method of claim 6, wherein a position of the other additive glint texture on the sclera texture is based at least in part on a position of a first of two intersecting spheres, and wherein the first sphere is arranged as a virtual eye ball and a second sphere overlays the first sphere as a virtual cornea that corresponds to the position of the virtual iris, and wherein axial positions of the first and second spheres correspond to the direction that the character is looking in the virtual environment.

8. The method of claim 1, wherein the virtual environment is at least one of a video game, chat room, movie, machinima, and a virtual world.

9. The method of claim 1, wherein the virtual eyelid includes at least one of a virtual upper eyelid and a virtual lower eyelid, and a singular circular eyelid that surrounds the circumference of the virtual eye.

10. A server for generating at least one virtual eye for a character in a virtual environment, comprising:
a memory for storing data; and
an eye engine for performing actions, including:
determining a size of a space bounded by a virtual eyelid for the at least one virtual eye of the character;
determining a sclera texture that is sized to cover the space bounded by the virtual eyelid;
determining a transparent texture that is sized to cover the sclera texture covering the space bounded by the virtual eyelid, wherein the transparent texture includes a virtual iris that is relatively smaller and positioned on the transparent texture in an orientation that corresponds to a direction that the character is looking in the virtual environment;
simulating a translucent solid for the translucent sclera texture, and wherein the translucent solid is illuminated based at least in part on at least one virtual light that is reflected by a concave surface inside the space bounded by the virtual eyelid of the character, and wherein the reflection of the light from the concave surface enables shadowing at an edge of an upper portion of the virtual eyelid and shadowing at another edge of a lower portion of the virtual eyelid; and
determining an additive glint texture and determining a position for placing the additive glint texture on the virtual iris based at least in part on the direction that the character is looking and at least one virtual light that is reflected at the space bounded by the virtual eyelid of the character.

11. The server of claim 10, wherein the eye engine performs further actions, including enabling a compositing of the respective layering of the sclera texture, transparent texture with the virtual iris, and the additive glint texture for the rendering of the at least one virtual eye of the character in the space bounded by the virtual eyelid.

12. The server of claim 10, wherein the illumination is employed to simulate virtual wetness of the sclera texture.

13. The server of claim 10, wherein the eye engine performs further actions, including determining another additive glint texture and its position on the sclera texture based at least in part on the direction that the character is looking in the virtual environment and the at least one virtual light that is reflected at the space bounded by the virtual eyelid of the character.

14. The server of claim 10, wherein the virtual eyelid includes at least one of a virtual upper eyelid and a virtual lower eyelid, and a singular circular eyelid that surrounds the circumference of the virtual eye.

15. A client for enabling a generation of at least one virtual eye for a character in a virtual environment, comprising:
a memory for storing data; and
an eye engine for performing actions, including:
determining a size of a space bounded by a virtual eyelid for the at least one virtual eye of the character;
determining a sclera texture that is sized to cover the space bounded by the virtual eyelid;
determining a transparent texture that is sized to cover the sclera texture covering the space bounded by the virtual eyelid, wherein the transparent texture includes a virtual iris that is relatively smaller and positioned on the transparent texture in an orientation that corresponds to a direction that the character is looking in the virtual environment;
simulating a translucent solid for the translucent sclera texture, and wherein the translucent solid is illuminated based at least in part on at least one virtual light that is reflected by a concave surface inside the space bounded by the virtual eyelid of the character, and wherein the reflection of the light from the concave surface enables shadowing at an edge of an upper portion of the virtual eyelid and shadowing at another edge of a lower portion of the virtual eyelid; and
determining an additive glint texture and determining a position for placing the additive glint texture on the virtual iris based at least in part on the direction that the character is looking and at least one virtual light that is reflected at the space bounded by the virtual eyelid of the character.

16. The client of claim 15, wherein the eye engine performs further actions, including enabling a compositing of the respective layering of the sclera texture, transparent texture with the virtual iris, and the additive glint texture for the rendering of the at least one virtual eye of the character in the space bounded by the virtual eyelid.

17. The client of claim 15, wherein the illumination simulates virtual wetness of the sclera texture.

18. The client of claim 15, wherein the eye engine performs further actions, including determining another additive glint texture and its position on the sclera texture based at least in part on the direction that the character is looking in the virtual environment and the at least one virtual light that is reflected at the space bounded by the virtual eyelid of the character.

19. A computer-readable storage medium having computer-executable instructions for extracting data from a network, the computer-executable instructions enabling actions, comprising:
enabling a determination of a size of a space bounded by a virtual eyelid for the at least one virtual eye of the character;
enabling a determination of a sclera texture that is sized to cover the space bounded by the virtual eyelid;
enabling a determination of a transparent texture that is sized to cover the sclera texture covering the space bounded by the virtual eyelid, wherein the transparent texture includes a virtual iris that is relatively smaller and positioned on the transparent texture in an orientation that corresponds to a direction that the character is looking in the virtual environment;
enabling a simulation of a translucent solid for the translucent sclera texture, and wherein the translucent solid is illuminated based at least in part on at least one virtual light that is reflected by a concave surface inside the space bounded by the virtual eyelid of the character, and wherein the reflection of the light from the concave surface enables shadowing at an edge of an upper portion of the virtual eyelid and shadowing at another edge of a lower portion of the virtual eyelid;

enabling a determination of an additive glint texture and a determination of a position for placing the additive glint texture on the virtual iris based at least in part on the direction that the character is looking and at least one virtual light that is reflected at the space bounded by the virtual eyelid; and enabling a compositing of the respective layering of the sclera texture, transparent texture with the virtual iris, and the additive glint texture for the rendering of the at least one virtual eye of the character in the space bounded by the virtual eyelid.

\* \* \* \* \*